United States Patent
Ishigami et al.

(10) Patent No.: US 9,429,726 B2
(45) Date of Patent: Aug. 30, 2016

(54) OPTICAL MODULE

(71) Applicant: Hitachi Metals, Ltd., Tokyo (JP)

(72) Inventors: Yoshiaki Ishigami, Hitachi (JP); Kinya Yamazaki, Hitachi (JP); Yoshinori Sunaga, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/936,782

(22) Filed: Nov. 10, 2015

(65) Prior Publication Data

US 2016/0062064 A1     Mar. 3, 2016

Related U.S. Application Data

(62) Division of application No. 13/722,062, filed on Dec. 20, 2012, now Pat. No. 9,229,182.

(30) Foreign Application Priority Data

Dec. 20, 2011    (JP) ................................. 2011-278123

(51) Int. Cl.
     *G02B 6/42*       (2006.01)

(52) U.S. Cl.
CPC ........... *G02B 6/4268* (2013.01); *G02B 6/4219* (2013.01); *G02B 6/4236* (2013.01); *G02B 6/4269* (2013.01); *G02B 6/4292* (2013.01);
(Continued)

(58) Field of Classification Search
CPC . G02B 6/4219; G02B 6/4268; G02B 6/4269
USPC .................................................... 385/88–94
See application file for complete search history.

(56) References Cited

U.S. PATENT DOCUMENTS 7,329,054 B1    2/2008   Epitaux et al.
8,382,384 B2    2/2013   Nekado et al.
(Continued)

FOREIGN PATENT DOCUMENTS

JP     2002-243990 A    8/2002
JP     2007-147664 A    6/2007
(Continued)

OTHER PUBLICATIONS

Japanese Office Action dated Jan. 27, 2015 from related Japanese Patent Application No. 2011-278123, together with an English language translation.
(Continued)

*Primary Examiner* — Daniel Petkovsek
(74) *Attorney, Agent, or Firm* — Scully, Scott, Murphy & Presser, PC

(57) ABSTRACT

An optical module includes a circuit board, a photoelectric conversion element mounted on the circuit board, an optical connector for optically connecting the photoelectric conversion element and an optical fiber, a semiconductor circuit element mounted on the circuit board and electrically connected to the photoelectric conversion element, a pressing member for pressing and fixing the optical connector to the circuit board, and a supporting member for supporting the pressing member. The supporting member includes a heat-absorbing surface and a heat-dissipating surface. The heat-absorbing surface is thermally connected to the semiconductor circuit element. The heat-dissipating surface dissipates heat of the semiconductor circuit element to be absorbed through the heat-absorbing surface.

4 Claims, 16 Drawing Sheets

(52) U.S. Cl.
CPC ............. *G02B 6/4295* (2013.01); *G02B 6/423* (2013.01); *G02B 6/428* (2013.01); *G02B 6/4214* (2013.01)

(56) References Cited

U.S. PATENT DOCUMENTS

| | | |
|---|---|---|
| 8,469,607 B2 | 6/2013 | Rosenberg et al. |
| 8,787,711 B2 | 7/2014 | Zbinden et al. |
| 8,867,869 B2 | 10/2014 | Steijer et al. |
| 8,888,383 B2 | 11/2014 | McColloch |
| 9,229,182 B2 * | 1/2016 | Ishigami ............... G02B 6/4268 |
| 2006/0140552 A1 | 6/2006 | Mizue et al. |
| 2008/0175544 A1 | 7/2008 | Fujiwara et al. |
| 2009/0245800 A1 | 10/2009 | Sone et al. |
| 2011/0026888 A1 | 2/2011 | Nekado et al. |
| 2011/0123151 A1 | 5/2011 | Zbinden et al. |
| 2012/0148202 A1 | 6/2012 | Banal, Jr. et al. |

FOREIGN PATENT DOCUMENTS

| | | |
|---|---|---|
| JP | 2009-170675 A | 7/2009 |
| JP | 2009-251600 A | 10/2009 |
| JP | 2011-191778 A | 9/2011 |
| WO | 2009/128413 A1 | 10/2009 |

OTHER PUBLICATIONS

Office Action dated Mar. 3, 2015 from related U.S. Appl. No. 13/722,062.

Office Action dated Jun. 17, 2015 from related U.S. Appl. No. 13/722,062.

Notice of Allowance dated Sep. 10, 2015 from related U.S. Appl. No. 13/722,062.

* cited by examiner

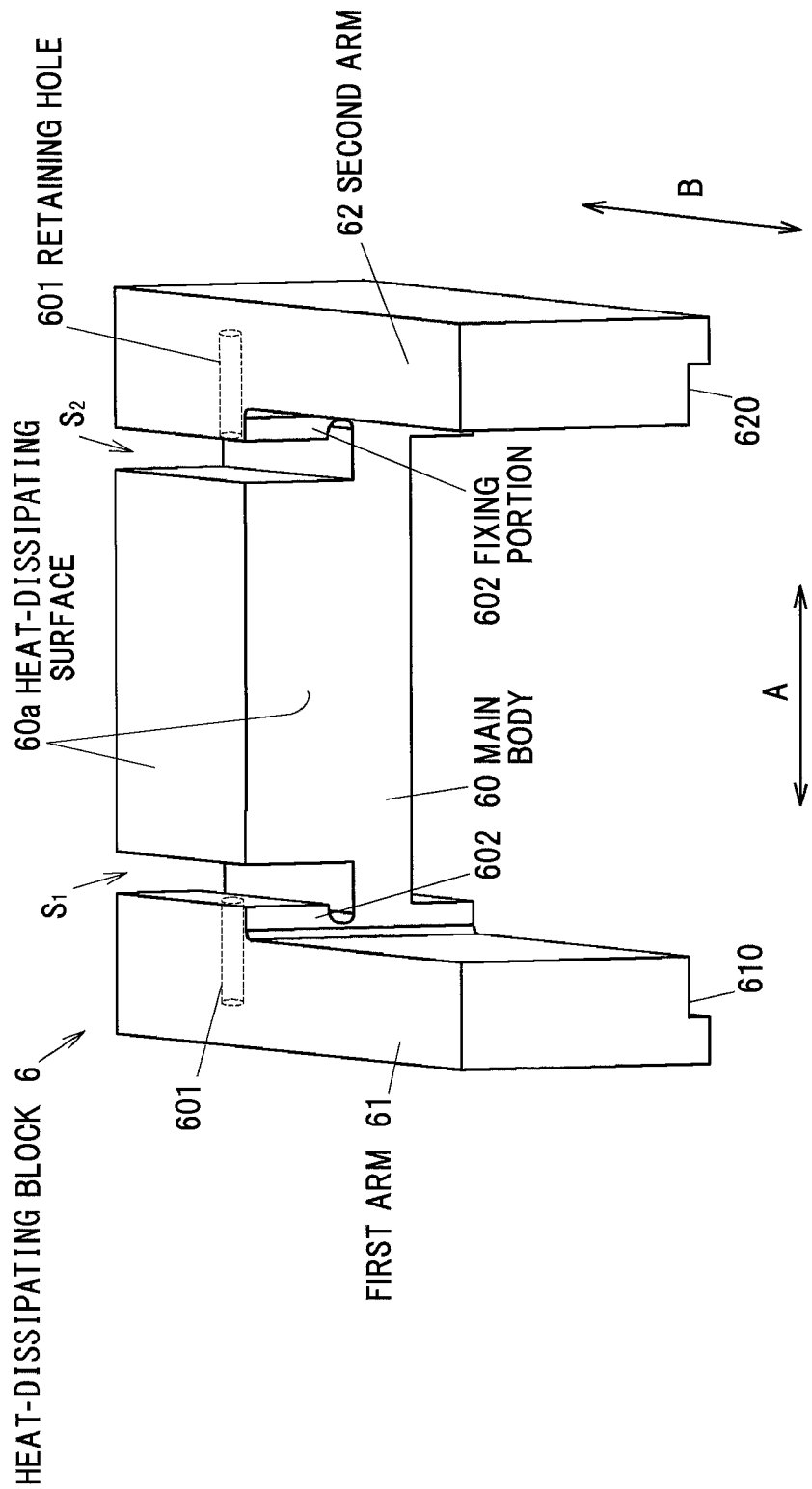

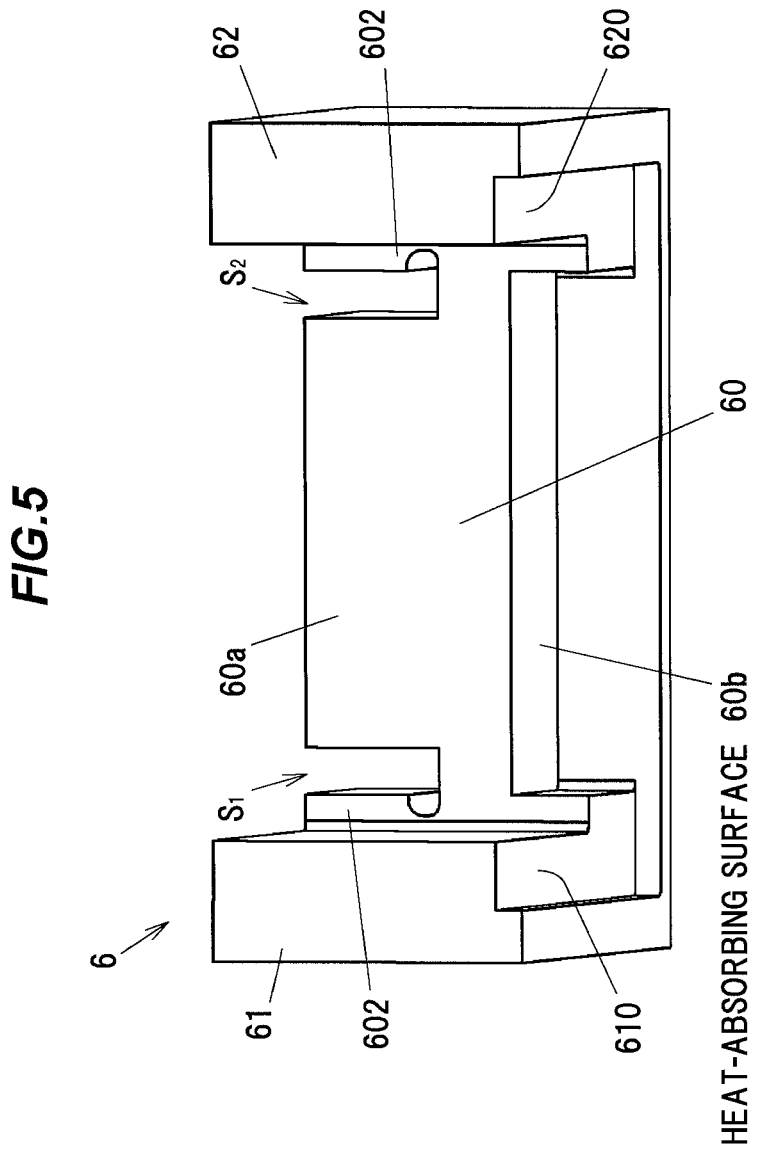

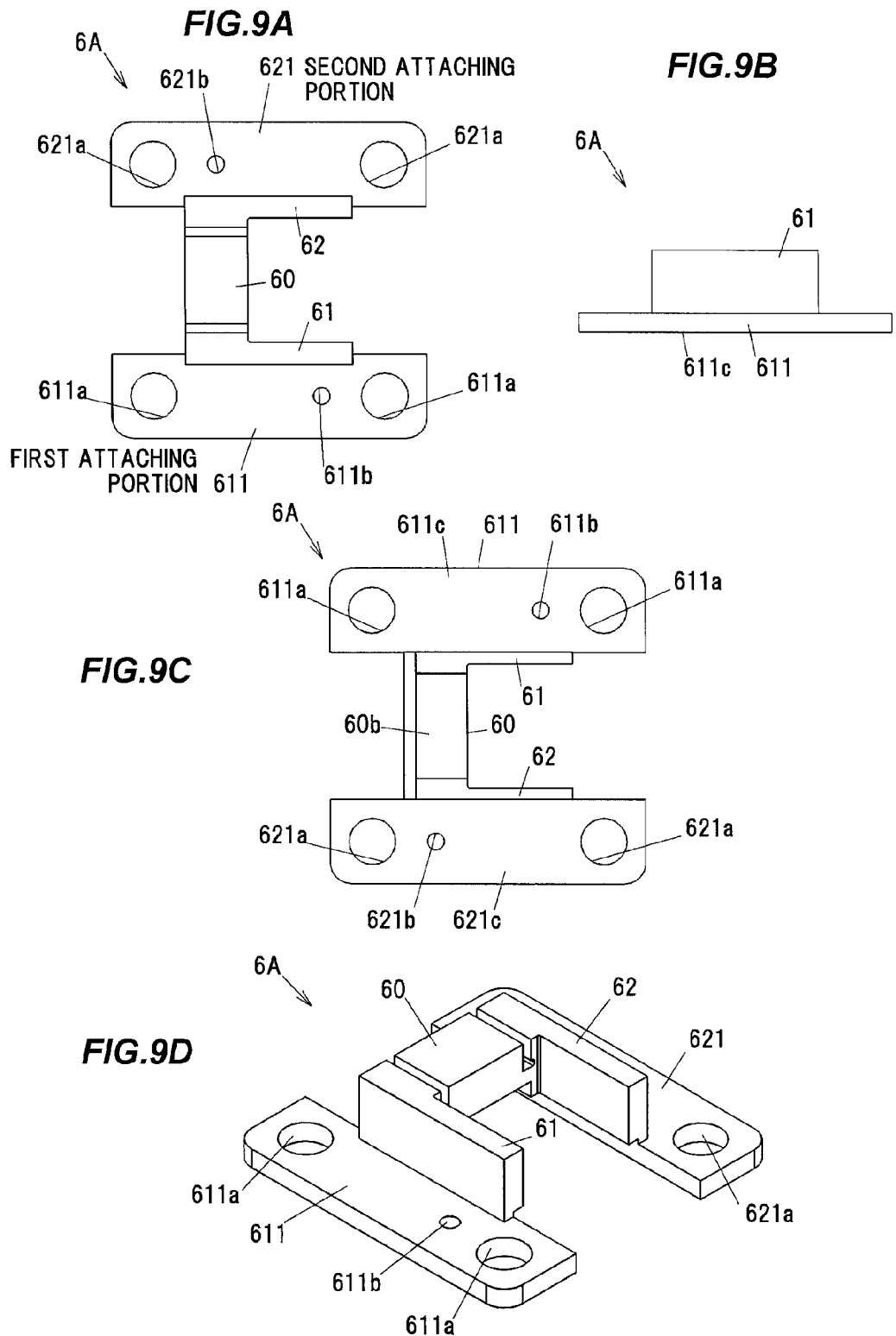

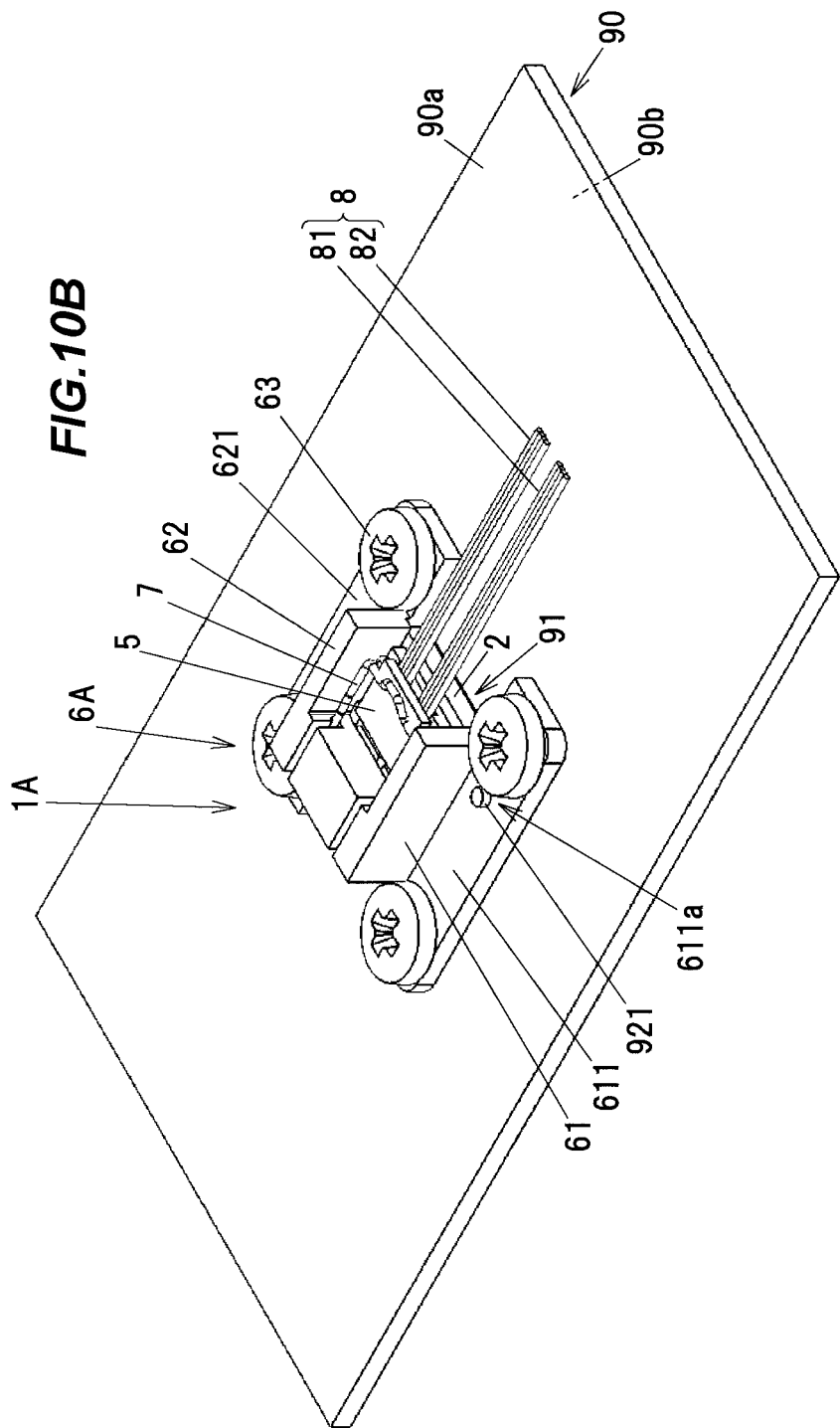

OPTICAL MODULE

The present application is a divisional application of U.S. Ser. No. 13/722,062 filed on Dec. 20, 2012, now U.S. Pat. No. 9,229,182 granted on Jan. 5, 2016 and claims the benefit of priority from Japanese patent application No. 2011-278123 filed on Dec. 20, 2011, the entire contents of each of which are incorporated herein by reference.

BACKGROUND OF THE INVENTION

1. Field of the Invention

The invention relates to an optical module which transmits signals through an optical fiber.

2. Description of the Related Art

A conventional optical module is known, which is provided with a photoelectric conversion element for converting electrical energy into optical energy or vise versa and in which signals are transmitted or received through an optical fiber (see JP-A-2002-243990).

The optical module described in JP-A-2002-243990 is configured such that a preamplifier IC, a PD (photodiode) element and a lens are housed inside a ceramic package having a one-side opened box shape of which opening is hermetically sealed with a metal lid. A ferrule having an optical fiber internally fixed thereto is inserted into the ceramic package and light emitted from the optical fiber is incident on the PD element through the lens. The PD element converts light intensity into an electrical signal and outputs the electrical signal to the preamplifier IC.

In addition, JP-A-2002-243990 also describes an optical module in which VCSEL (Vertical Cavity Surface Emitting Laser) device and a laser driver IC are housed in the ceramic package in place of the PD element and the preamplifier IC.

SUMMARY OF THE INVENTION

A semiconductor circuit element such as preamplifier IC or laser driver IC which is connected to a photoelectric conversion element such as PD element or VCSEL device generates heat during use. In the optical module described in JP-A-2002-243990, since a space for housing the preamplifier IC or the laser driver IC is hermetically sealed, temperature inside the housing space easily becomes high and may go beyond the operating temperature limit of the preamplifier IC or the laser driver IC, etc., depending on usage conditions. Therefore, usage is restricted or it may be necessary to, e.g., provide an air-cooling fan in the vicinity of the optical module. In addition, the problem of heat generation in the semiconductor circuit element is remarkable in a multichannel optical module which performs multi-channel communications using plural optical fibers.

Accordingly, it is an object of the invention to provide an optical module that can suppress a temperature rise of a semiconductor circuit element which is electrically connected to a photoelectric conversion element.

(1) According to one embodiment of the invention, an optical module comprises:

a circuit board;

a photoelectric conversion element mounted on the circuit board;

an optical connector for optically connecting the photoelectric conversion element and an optical fiber;

a semiconductor circuit element mounted on the circuit board and electrically connected to the photoelectric conversion element;

a pressing member for pressing and fixing the optical connector to the circuit board; and a supporting member for supporting the pressing member, wherein the supporting member comprises a heat-absorbing surface and a heat-dissipating surface, wherein the heat-absorbing surface is thermally connected to the semiconductor circuit element, and wherein the heat-dissipating surface dissipates heat of the semiconductor circuit element to be absorbed through the heat-absorbing surface.

In the above embodiment (1) of the invention, the following modifications and changes can be made.

(i) The heat-absorbing surface is formed parallel to the circuit board while sandwiching the semiconductor circuit element in between, wherein a gap between the heat-absorbing surface and the circuit board corresponds to a thickness of the semiconductor circuit element, and wherein a heat transfer member for conducting heat from the semiconductor circuit element to the heat-absorbing surface is disposed between the heat-absorbing surface and the semiconductor circuit element.

(ii) The supporting member integrally comprises a main body extending in a first direction and a pair of arm portions extending in a second direction from both ends of the main body in the first direction so as to sandwich the optical connector, and wherein the first direction intersects with an extending direction of the optical fiber held by the optical connector and the second direction is orthogonal to the first direction.

(iii) The circuit board comprises a plurality of electrodes on a non-mounting surface that is opposite to a mounting surface with the semiconductor circuit element mounted thereon, and wherein the supporting member comprises an attaching portion to be fixed to a counterpart board that has a plurality of counterpart electrodes electrically connected to the plurality of electrodes.

(iv) The pair of arm portions each comprise a fitting portion for fitting the circuit board thereto.

(v) The pressing member comprises a supported portion to be engaged with the supporting member so as to pivot about the supported portion, and wherein the supporting member comprises a fixing portion for fixing the pressing member in a state that the optical connector is pressed by the pressing member.

(vi) The optical connector is restricted from moving in a direction parallel to the circuit board by fitting a protrusion provided upright on the circuit board.

Effects of the Invention

According to one embodiment of the invention, an optical module is constructed such that a heat-dissipating block thereof has both a function as a heat-dissipating member for dissipating heat generated by a driver IC and a preamplifier IC and a function as a supporting member for supporting a lever member for pressing an optical connector against a circuit board. This eliminates the necessity of separately providing the supporting member and the heat-dissipating member, and it is thus possible to reduce the number of components and assembly steps.

BRIEF DESCRIPTION OF THE DRAWINGS

Next, the present invention will be explained in more detail in conjunction with appended drawings, wherein:

FIG. 4 is a perspective view showing a heat-dissipating block;

FIG. 5 is a perspective view showing the heat-dissipating block as viewed from a different direction;

FIGS. 9A to 9D show a heat-dissipating block of an optical module in a third embodiment, wherein FIG. 9A is a top view, FIG. 9B is a front view, FIG. 9C is a bottom view and FIG. 9D is a perspective view;

FIG. 10B is perspective view showing a state in which the optical module is attached to the electronic circuit board;

DETAILED DESCRIPTION OF THE PREFERRED EMBODIMENTS

First Embodiment

A structural example of an optical module in a first embodiment of the invention will be described below in reference to FIGS. 1A to 7. This optical module is mounted on, e.g., an electronic circuit board having a CPU (Central Processing Unit), etc., mounted thereon and is used for communication with another electronic circuit board which is housed together with the aforementioned electronic circuit board in a common rack.

Figure 1A:
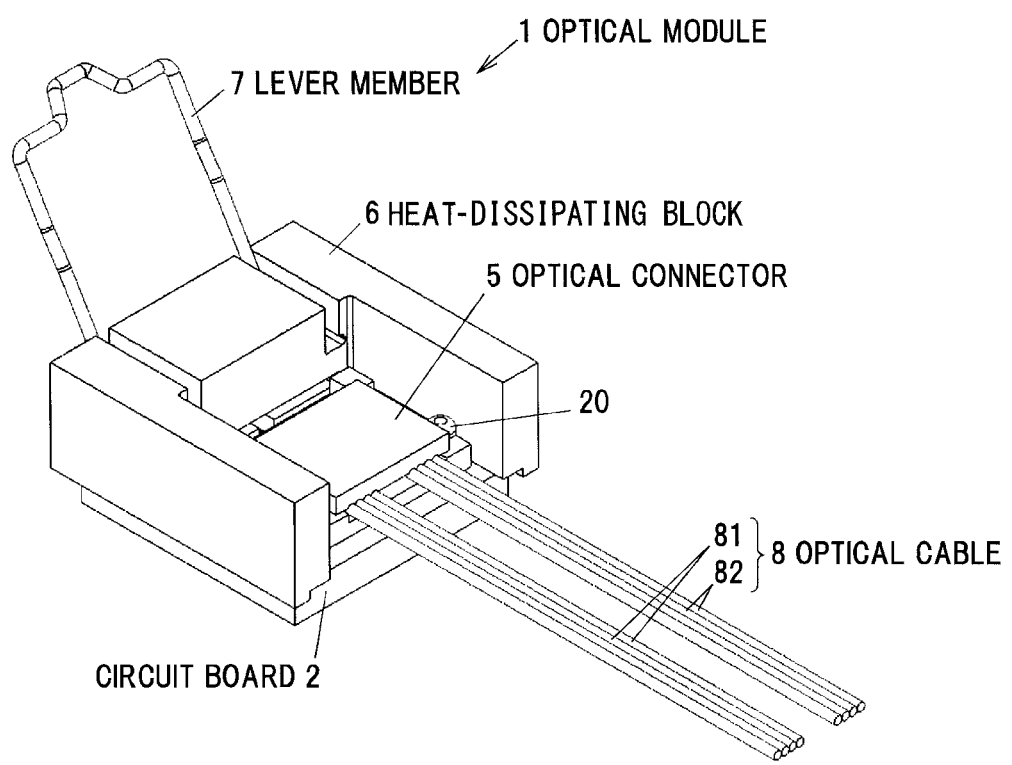
FIG. 1A is a perspective view showing a non-locked state of an optical module in a first embodiment.
Figure 1B:
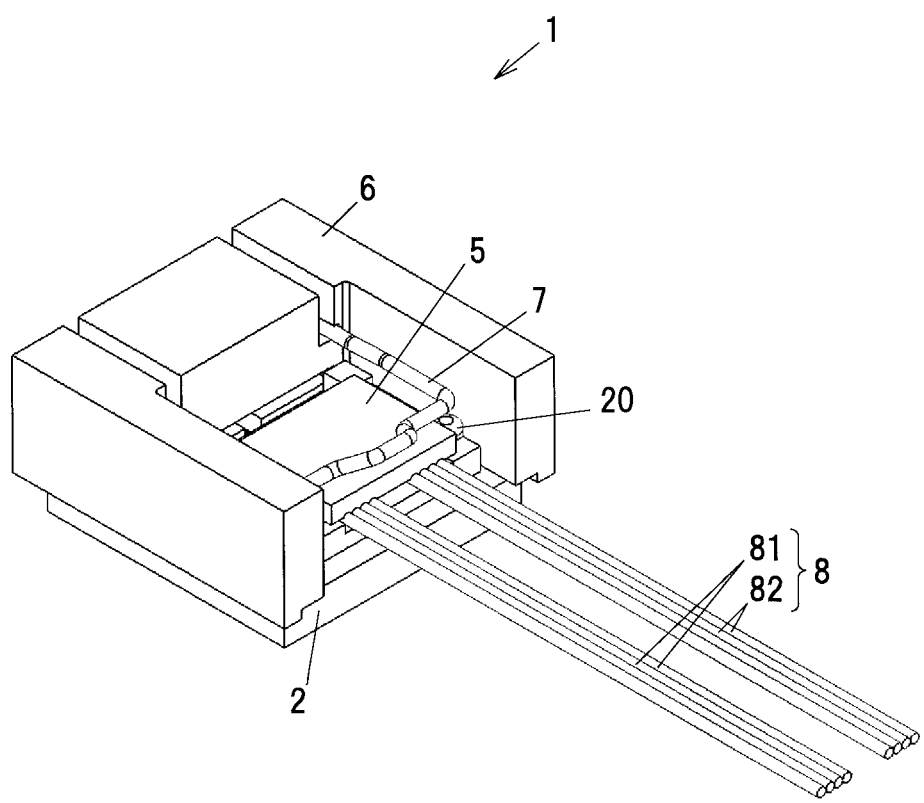
FIG. 1B is a perspective view showing a locked state of the optical module in the first embodiment.
Figure 2:
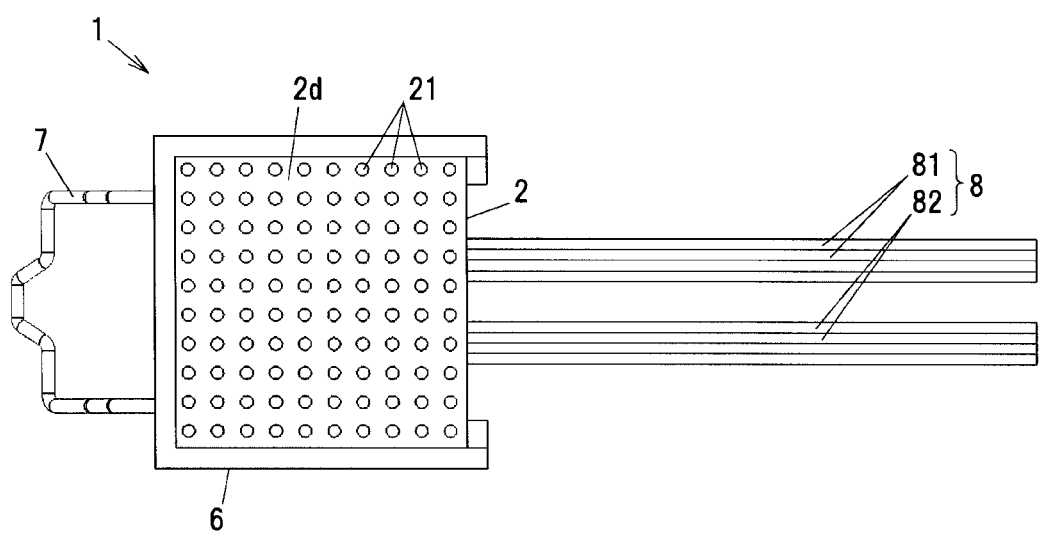
FIG. 2 is a plan view showing a back side of the optical module.
Figure 3A:
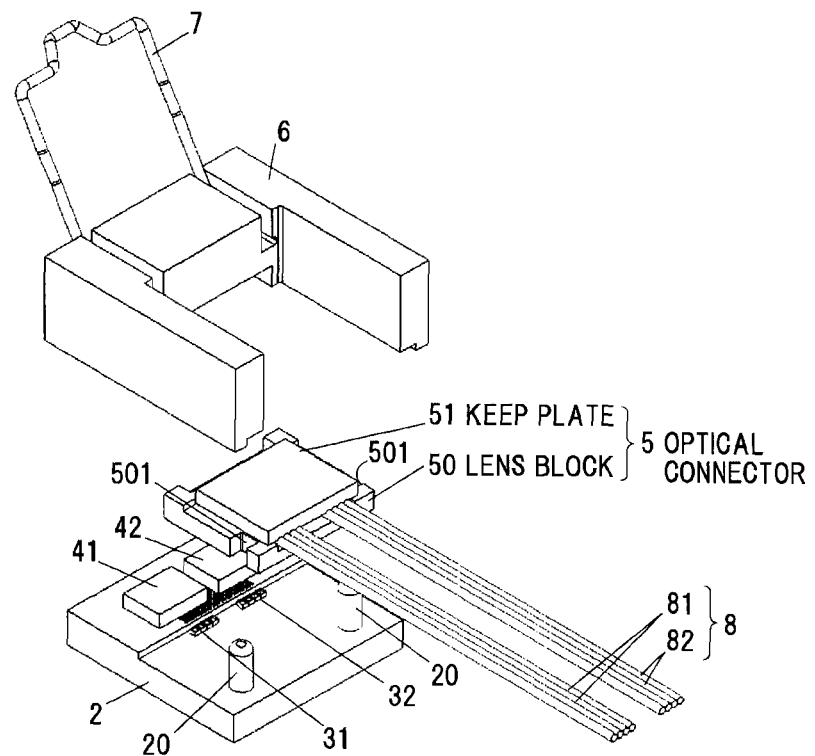
FIG. 3A is an exploded perspective view showing the optical module and FIG. 3B is a partial enlarged view of FIG. 3A.
Figure 3B:
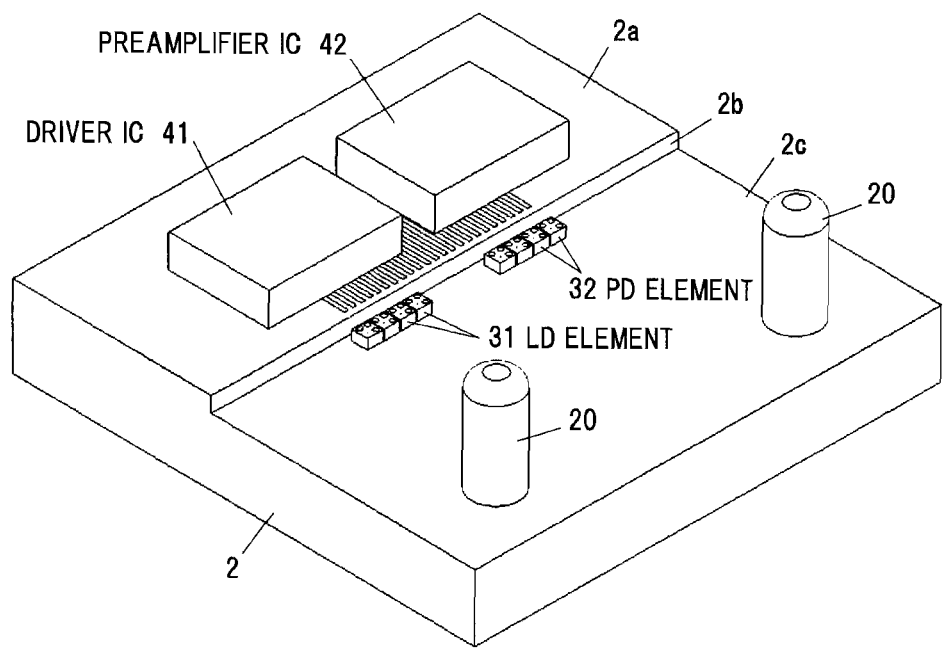

FIGS. 1A and 1B are perspective views of an optical module in the first embodiment, showing with an optical cable composed of plural optical fibers. FIG. 2 is a plan view showing a back side of the optical module. FIG. 3A is an exploded perspective view showing the optical module and FIG. 3B is a partial enlarged view thereof.

An optical module 1 has a plate-like circuit board 2 on which plural LD (Laser Diode) elements 31, plural PD (Photo Diode) elements 32, a driver IC (Integrated Circuit) 41 and a preamplifier IC 42 are mounted, an optical connector 5, a heat-dissipating block 6 as a supporting member, and a lever member 7 as a pressing member supported by the heat-dissipating block 6.

The LD elements 31 and the PD elements 32 are mounted on a second mounting surface 2c (shown in FIG. 3B) of the circuit board 2 while the driver IC 41 and the preamplifier IC 42 are mounted on a first mounting surface 2a of the circuit board 2. The LD element 31 and the PD element 32 are examples of a photoelectric conversion element of the invention. Meanwhile, the driver IC 41 and the preamplifier IC 42 are examples of a semiconductor circuit element of the invention.

As shown in FIGS. 1A and 1B, the lever member 7 is pivotally supported by the heat-dissipating block 6. In a non-locked state of the lever member 7 as shown in FIG. 1A, the optical connector 5 is attachable and detachable to and from the circuit board 2 and the heat-dissipating block 6. On the other hand, in a locked state of the lever member 7 as shown in FIG. 1B, the lever member 7 presses the optical connector 5 against the circuit board 2, thereby fixing the optical connector 5 to the circuit board 2 and the heat-dissipating block 6.

As shown in FIG. 2, plural electrodes 21 are arranged in a grid-like pattern on a rear surface 2d which is a non-mounting surface of the circuit board 2. The electrodes 21 are electrically connected to terminals of the driver IC 41 and the preamplifier IC 42.

As shown in FIG. 3A, the optical connector 5 has a lens block 50 formed of a translucent resin such as acrylic and a keep plate 51 formed of a plate-like non-translucent resin. A pair of recessed portions 501 which are depressed inwardly from an outer edge of the lens block 50 is formed on the lens block 50.

An end portion of an optical cable 8 which is composed of plural optical fibers 81 and 82 is sandwiched and held between the lens block 50 and the keep plate 51. The lens block 50 and the keep plate 51 are fixed to each other by, e.g., an adhesive.

As shown in FIG. 3B, a thickness of the circuit board 2 in a region of the first mounting surface 2a (a distance from the first mounting surface 2a to the rear surface 2d) is larger than a thickness of the circuit board 2 in a region of the second mounting surface 2c (a distance from the second mounting surface 2c to the rear surface 2d). A step surface 2b which is parallel to a thickness direction of the circuit board 2 is formed between the first mounting surface 2a and the second mounting surface 2c. The first mounting surface 2a, the second mounting surface 2c and the rear surface 2d are parallel to each other.

In the first embodiment, four LD elements 31 and four PD elements 32 are mounted on the second mounting surface 2c in the vicinity of the step surface 2b so as to be arranged in a row along the step surface 2b. Non-illustrated bonding wires are used for electrical connections between the four LD elements 31 and the driver IC 41 and between the four PD elements 32 and the preamplifier IC 42.

In addition, a pair of columnar protrusions 20 is provided on the second mounting surface 2c of the circuit board 2. The pair of protrusions 20 is provided upright so that a central axis thereof is perpendicular to the second mounting surface 2c of the circuit board 2. A space between the pair of protrusions 20 corresponds to a space between the pair of recessed portions 501 of the lens block 50, and the optical connector 5 is restricted from moving in a direction parallel to the circuit board 2 by respectively fitting the pair of protrusions 20 to the pair of recessed portions 501.

FIG. 4 is a perspective view showing the heat-dissipating block 6. FIG. 5 is a perspective view showing the heat-dissipating block 6 as viewed from a different direction from that of FIG. 4.

The heat-dissipating block 6 is formed of a metal, e.g., aluminum, etc., and integrally has a rectangular parallelepiped main body 60, and first and second arms 61 and 62 as a pair of arm portions which are formed to protrude parallel to each other from both end portions of the main body 60.

The main body 60 is formed to extend in a first direction (indicated by an arrow-A in FIG. 4) intersecting an extending direction of the optical fibers 81 and 82 which are held by the optical connector 5. The first arm 61 and the second arm 62 are formed to extend in a second direction (indicated by an arrow-B in FIG. 4) orthogonal to the first direction from the both end portions in the first direction of the main body 60 so as to sandwich the optical connector 5. In the first embodiment, an extending direction of the first arm 61 and the second arm 62 (the second direction) is parallel to the extending direction of the optical fibers 81 and 82 supported by the optical connector 5 and is also orthogonal to an extending direction of the main body 60 (the first direction).

A first slit $S_1$ and a second slit $S_2$ are formed on the main body 60. The first slit $S_1$ is formed on the first arm 61 side and the second slit $S_2$ is formed on the second arm 62 side. The first slit $S_1$ and the second slit $S_2$ penetrate the main body 60 in a direction parallel to the first arm 61 and the second arm 62. In addition, a pair of retaining holes 601 is formed on the main body 60. One of the retaining holes 601 has an opening at an end portion thereof in the first slit $S_1$ and the other retaining hole 601 has an opening at an end portion thereof in the second slit $S_2$.

In the first slit $S_1$ and the second slit $S_2$, a bottom portion on the circuit board 2 side is formed as a wide-width portion which is wider than other portion (narrow-width portion). The bottom portion of the first slit $S_1$ is formed to broaden toward the first arm 61 and the bottom portion of the second slit $S_2$ is formed to broaden toward the second arm 62.

A fixing portion 602 for fixing the lever member 7 in the locked state shown in FIG. 1B is formed on the narrow-width portion of the first slit $S_1$ on the first arm 61 side and also on the narrow-width portion of the second slit $S_2$ on the second arm 62 side. In the first slit $S_1$ and the second slit $S_2$, a step between the wide-width portion and the narrow-width portion is formed by the fixing portion 602.

The optical connector 5 is arranged between the first arm 61 and the second arm 62, as shown in FIG. 1A. In addition, notches 610 and 620 for fitting the circuit board 2 are respectively formed on the first arm 61 and the second arm 62. The notch 610 is formed on a portion of a bottom surface of the first arm 61 (a surface which can be seen from the rear surface 2d of the circuit board 2) on the second arm 62 side, and the notch 620 is formed on a portion of a bottom surface of the second arm 62 (the same definition as the above) on the first arm 61 side. The notches 610 and 620 are examples of a fitting portion to which the circuit board 2 is fitted. The heat-dissipating block 6 and the circuit board 2 are fixed to each other by, e.g., bonding at the notches 610 and 620.

Meanwhile, the heat-dissipating block 6 has a heat-absorbing surface 60b thermally connected to the driver IC 41 as well as to the preamplifier IC 42 and a heat-dissipating surface 60a for dissipating heat of the driver IC 41 and the preamplifier IC 42 which is absorbed by the heat-absorbing surface 60b. The heat-absorbing surface 60b is formed on a surface of the main body 60 which faces the circuit board 2. The heat-dissipating surface 60a is formed on a surface of the main body 60 excluding the heat-absorbing surface 60b.

Figure 6:
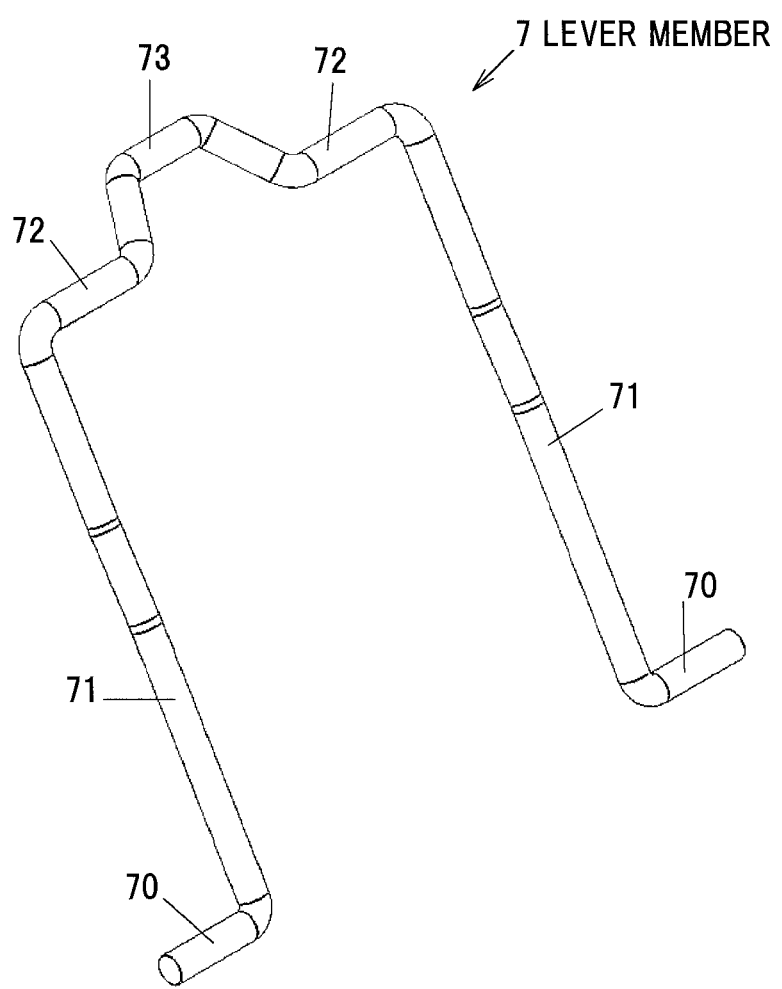
FIG. 6 is a perspective view showing a lever member.

FIG. 6 is a perspective view showing the lever member 7. The lever member 7 is formed by bending a rod-like elastic metal member and has a pair of supported portions 70, a pair of coupling portions 71, a pair of pressing portions 72 and a handling portion 73. The pair of supported portions 70 and the pair of coupling portions 71 are orthogonal to each other, and the pair of supported portions 70 is formed to extend in directions opposite to each other from one end of the pair of coupling portions 71. In addition, the pair of pressing portions 72 is formed to approach to each other from another end of the pair of coupling portions 71. The handling portion 73 is formed between the pair of pressing portions 72.

The pair of supported portions 70 is respectively housed in the pair of retaining holes 601 of the heat-dissipating block 6 and the lever member 7 can thereby pivot about the pair of supported portions 70. In the locked state shown in FIG. 1B, the pair of pressing portions 72 is in contact with the keep plate 51 of the optical connector 5 and applies a force to the optical connector 5 toward the circuit board 2. In order to facilitate pivotal operation of the lever member 7 by a finger of an operator, the handling portion 73 is bent so that a space is formed between the handling portion 73 and the optical connector 5 in a locked state.

The pair of coupling portions 71 is located in the narrow-width portions of the first slit $S_1$ and the second slit $S_2$ when the lever member 7 is in the non-locked state shown in FIG. 1A, and the pair of coupling portions 71 is located in the wide-width portions of the first slit $S_1$ and the second slit $S_2$ in the locked state shown in FIG. 1B. A force is applied to the lever member 7 by elasticity thereof so as to separate the pair of coupling portions 71 from each other, and the pivot of the lever member 7 is restricted in the locked state by engagement of the pair of coupling portions 71 with the fixing portions 602 of the heat-dissipating block 6. In other words, the state that the lever member 7 presses the optical connector 5 is maintained unless, e.g., a worker pivotally operates the lever member 7 by applying an external force.

Figure 7:
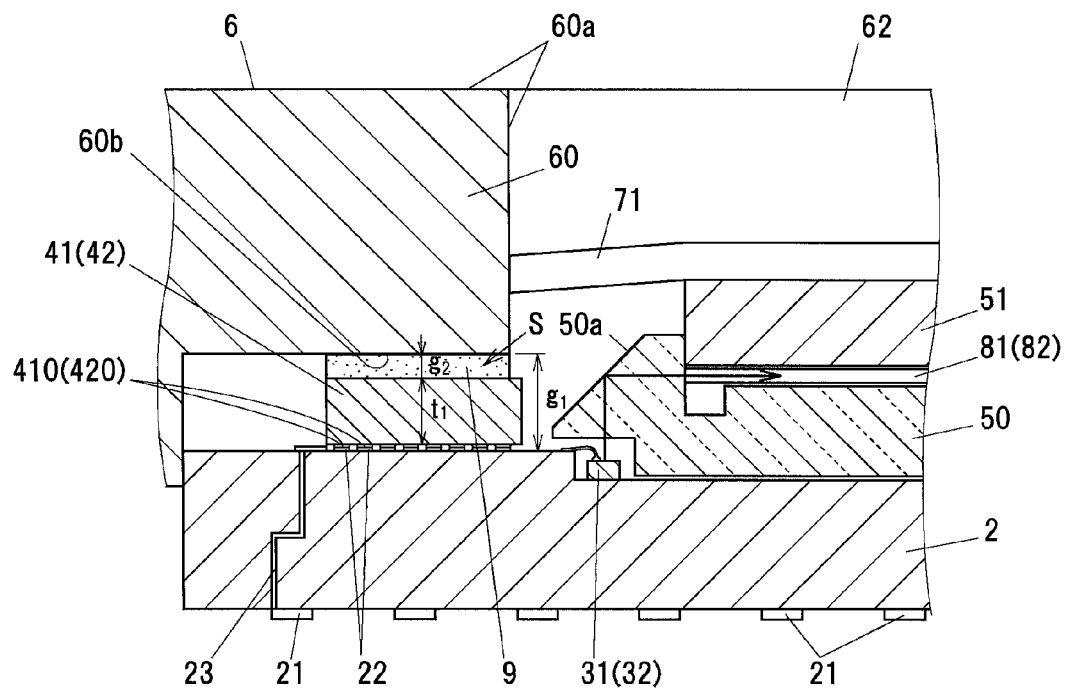
FIG. 7 is a cross sectional view showing the optical module in the first embodiment when cutting between first and second arms.

FIG. 7 is a cross sectional view showing the optical module 1 when cutting between the first arm 61 and the second arm and 62.

The driver IC 41 has plural electrodes 410 on a rear surface thereof. The electrodes 410 are electrically connected by a non-illustrated solder to electrodes 22 formed on the first mounting surface 2a of the circuit board 2. The electrodes 22 are connected to the electrodes 21 formed on the rear surface 2d of the circuit board 2 by wirings 23 provided in the circuit board 2.

The driver IC 41 receives an electrical signal transmitted through the electrodes 22 and the wirings 23, and outputs a drive current to the LD element 31. The LD element 31 emits laser light when receiving the drive current, and the laser light is reflected at a reflecting surface 50a formed on the lens block 50 and enters optical fiber 81.

Meanwhile, the light emitted from the optical fiber 82 is reflected at the reflecting surface 50a of the lens block 50 and enters the PD element 32. In the PD element 32, variation in incident light intensity is converted into an electrical signal and is then output to the preamplifier IC 42. In the preamplifier IC 42, the electrical signal is amplified and is then output from electrodes 420 on the back side. The electrodes 420 are electrically connected to the electrodes 22 of the circuit board 2.

As described above, the LD element 31 and the PD element 32 are optically connected to the optical fibers 81 and 82 by the lens block 50 of the optical connector 5, and the driver IC 41 and the preamplifier IC 42 optically communicate by the LD element 31 and the PD element 32 using the optical fibers 81 and 82 as transmission media.

Surfaces of the driver IC 41 and the preamplifier IC 42 (surfaces opposite to the circuit board 2) face the heat-dissipating surface 60a of the heat-dissipating block 6 and a heat transfer member 9 is arranged therebetween. As the heat transfer member 9, it is possible to use, e.g., a heat-transfer sheet, etc., formed of thermally-conductive grease or silicone. In the first embodiment, the surfaces of the driver IC 41 and the preamplifier IC 42 are thermally connected to the heat-absorbing surface 60b of the heat-dissipating block 6 by the heat transfer member 9.

The heat-absorbing surface 60b is formed parallel to the first mounting surface 2a of the circuit board 2 so that the driver IC 41 and the preamplifier IC 42 are sandwiched between the heat-absorbing surface 60b and the circuit board 2. In addition, a gap $g_1$ between the heat-absorbing surface 60b and the first mounting surface 2a of the circuit board 2 has a size corresponding to a thickness $t_1$ of the driver IC 41 and the preamplifier IC 42. In more detail, the gap $g_1$ has such a size that the a slight space S is formed between the heat-absorbing surface 60b and the surfaces of the driver IC 41 and the preamplifier IC 42, and a size $g_2$ of the space S is, e.g., not more than half of the thickness $t_1$ of the driver IC 41 and the preamplifier IC 42.

Functions and Effects of the First Embodiment

The following functions and effects are obtained in the first embodiment.

(1) The heat-dissipating block 6 has both a function as a heat-dissipating member for dissipating heat generated by the driver IC 41 and the preamplifier IC 42 and a function as a supporting member for supporting the lever member 7 which presses the optical connector 5 against the circuit board 2. This eliminates the necessity of separately providing the supporting member and the heat-dissipating member and it is thus possible to reduce the number of components and assembly steps.

(2) The heat generated by the driver IC 41 and the preamplifier IC 42 is transferred to the heat-dissipating block 6 through the heat-absorbing surface 60b via the heat transfer member 9, and is dissipated to the air from the heat-dissipating surface 60a of the heat-dissipating block 6. This suppresses overheating of the driver IC 41 and the preamplifier IC 42.

(3) Since the heat transfer member 9 is interposed between the driver IC 41, the preamplifier IC 42 and the heat-absorbing surface 60b, it is possible to efficiently conduct heat of the driver IC 41 and the preamplifier IC 42 to the heat-absorbing surface 60b.

(4) Since the optical connector 5 is restricted from moving in a direction parallel to the first and second arms 61 and 62 by the protrusions 20, it is possible to securely hold the optical connector 5. In addition, the heat-dissipating block 6 is formed so that the main body 60 and the first and second arms 61 and 62 surround the rectangular optical connector 5 from three directions. Therefore, when the optical module 1 is pressed against an electronic circuit board mounting a CPU, etc., by pressing the heat-dissipating block 6, a pressing force is transmitted to the entire circuit board 2 by the main body 60 and the first and second arms 61 and 62, and pressure acting on the circuit board 2 is equalized.

(5) Since the circuit board 2 is fitted to the notches 610 and 620, it is easy to adjust the positions of the heat-dissipating block 6 and the circuit board 2 and the surfaces of the driver IC 41 and the preamplifier IC 42 can adequately face the heat-absorbing surface 60b.

Second Embodiment

Figure 8:
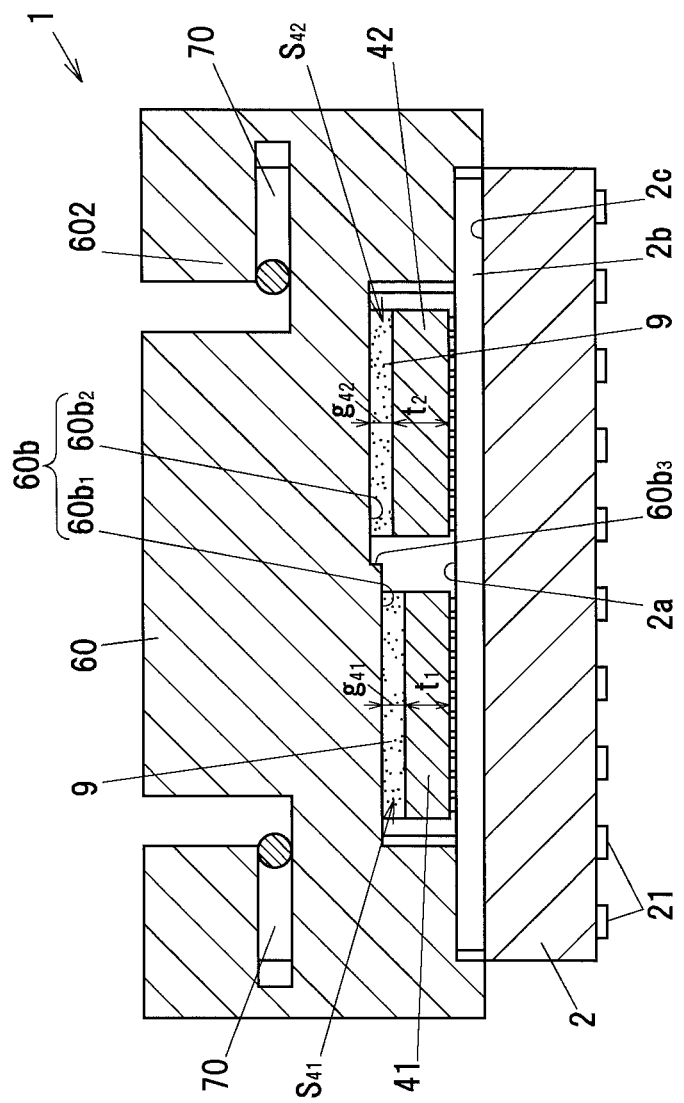
FIG. 8 is a cross sectional view showing an optical module in a second embodiment.

Next, the second embodiment of the invention will be described in reference to FIG. 8. FIG. 8 is a cross sectional view showing the optical module 1 in the second embodiment.

While the driver IC 41 and the preamplifier IC 42 described in the first embodiment have the same thickness $t_1$, the thickness of the driver IC 41 is different from that of the preamplifier IC 42 in the second embodiment such that a thickness $t_1$ of the driver IC 41 is thinner than a thickness $t_2$ of the preamplifier IC 42. Accordingly, the heat-absorbing surface 60b of the heat-dissipating block 6 is composed of a first step surface $60b_1$ corresponding to the driver IC 41 and a second step surface $60b_2$ corresponding to the preamplifier IC 42. A step surface $60b_3$ is formed between the first step surface $60b_1$ and the second step surface $60b_2$. Other configurations are the same as the optical module 1 of the first embodiment.

A size $g_{41}$ of a space $S_{41}$ between the first step surface $60b_1$ and the driver IC 41 is equivalent to a size $g_{42}$ of a space $S_{42}$ between the second step surface $60b_2$ and the preamplifier IC 42. In other words, it is configured that a size of a step from the first step surface $60b_1$ to the second step surface $60b_2$ is equal to a difference between the thickness $t_1$ of the driver IC 41 and the thickness $t_2$ of the preamplifier IC 42. The heat transfer member 9 is arranged between the first step surface $60b_1$ and the driver IC 41 and also between the second step surface $60b_2$ and the preamplifier IC 42.

In the second embodiment, although the thickness of the driver IC 41 and that of the preamplifier IC 42 are different, it is possible to efficiently conduct the heat of the driver IC 41 and the preamplifier IC 42 to the heat-absorbing surface 60b (the first step surface $60b_1$ and the second step surface $60b_2$).

Third Embodiment

Figure 10A:
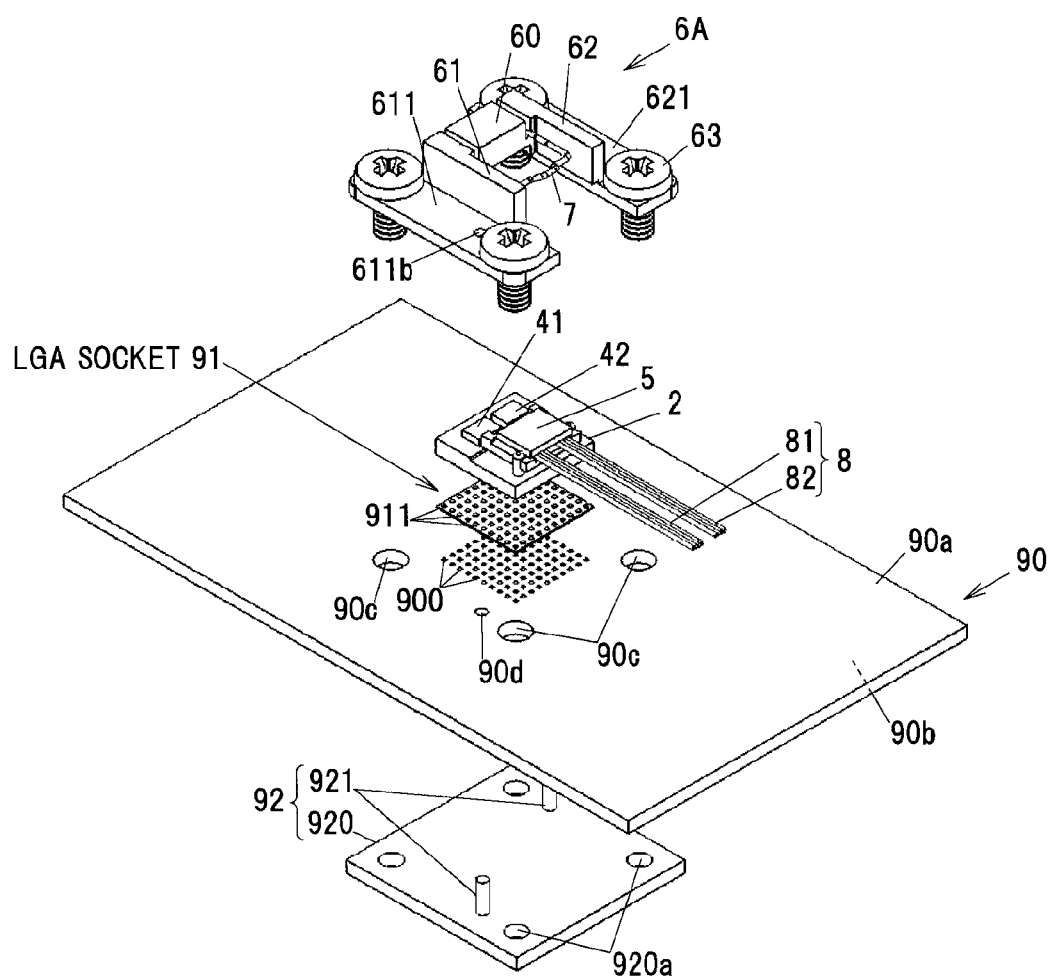
FIG. 10A is an exploded perspective view of an optical module, showing with an electronic circuit board, an LGA socket and an attaching member.

Next, the third embodiment of the invention will be described in reference to FIGS. 9, 10A and 10B. In FIGS. 9, 10A and 10B, constituent elements common to the first embodiment are denoted by the same reference numerals and the overlapped explanation will be omitted.

FIGS. 9A to 9D show a heat-dissipating block 6A of an optical module 1A in the third embodiment, wherein FIG. 9A is a top view, FIG. 9B is a front view, FIG. 9C is a bottom view and FIG. 9D is a perspective view. FIG. 10A is an exploded perspective view of the optical module 1A, showing with an electronic circuit board 90, an LGA (Land Grid Array) socket 91 and an attaching member 92. FIG. 10B is perspective view showing a state in which the optical module 1A is attached to the electronic circuit board 90.

The heat-dissipating block 6A integrally has a first attaching portion 611 and a second attaching portion 621 in addition to the main body 60, the first arm 61 and the second arm 62. The first attaching portion 611 is formed continuously with the first arm 61. The second attaching portion 621 is formed continuously with the second arm 62.

Two bolt insertion holes 611a and a through-hole 611b are formed on the first attaching portion 611. Two bolt insertion holes 621a and a through-hole 621b are formed on the second attaching portion 621. A bottom surface 611c of the first attaching portion 611 and a bottom surface 621c of the second attaching portion 621 are formed to be a flat surface.

The LGA socket 91 has plural pins 911 which are arranged in a grid-like pattern. The pin 911 incorporates a spring and has elasticity so as to be stretchable in a thickness direction of the LGA socket 91.

The electronic circuit board 90 is a printed-circuit board mounting non-illustrated plural electronic circuit components, such as CPU, and plural pad electrodes 900 are formed on a mounting surface 90a of the electronic circuit board 90. In addition, four bolt insertion holes 90c (only three bolt insertion holes 90c are shown in FIG. 10A) and two through-holes 90d (only one through-hole 90d is shown in FIG. 10A) are formed on the electronic circuit board 90. The electronic circuit board 90 is an example of a counterpart board of the invention and the pad electrode 900 is an example of a counterpart electrode of the invention.

The electrodes 21 of the circuit board 2 (see FIG. 7) are electrically connected to the pad electrodes 900 via the plural pins 911 of the LGA socket 91 which is interposed between the circuit board 2 and the electronic circuit board 90.

The first and second attaching portions 611 and 621 of the heat-dissipating block 6A are fixed to the electronic circuit board 90 by the attaching member 92 which is arranged on a non-mounting surface 90b side (a surface on the reverse side of the mounting surface 90a) of the electronic circuit board 90. The attaching member 92 has a plate-like main body 920 and two columnar protrusions 921 provided upright on the main body 920. Four threaded holes 920a are formed on the main body 920 so as to correspond to the respective four bolt insertion holes 90c of the electronic circuit board 90.

After positioning the optical module 1A and the attaching member 92 so that the two protrusions 921 penetrate the two through-holes 90d of the electronic circuit board 90 as well as the through-holes 611b and 621b of the first and second attaching portions 611 and 621, four bolts 63 are tightened, thereby attaching the optical module 1A to the electronic circuit board 90. The four bolts 63 are inserted into the bolt insertion holes 611a and 621a of the first and second attaching portions 611 and 621 and the bolt insertion holes 90c of the electronic circuit board 90, and are screwed into the threaded holes 920a of the attaching member 92. When the optical module 1A is attached to the electronic circuit board 90, the bottom surfaces 611c and 621c of the first and second attaching portions 611 and 621 are in contact with the mounting surface 90a of the electronic circuit board 90.

In the third embodiment, in addition to the functions and effects described in the first embodiment, overheating of the driver IC 41 and the preamplifier IC 42 is further suppressed since the heat of the driver IC 41 and the preamplifier IC 42 absorbed by the heat-absorbing surface 60b of the heat-dissipating block 6A is partially dissipated to the electronic circuit board 90 and the attaching member 92 via the first and second attaching portions 611 and 621.

In addition, since it is possible to press the entire circuit board 2 against the LGA socket 91 by the main body 60 and the first and second arms 61 and 62, it is possible to elastically deform the plural pins 911 of the LGA socket 91 by the electrodes 21 and thereby to securely electrically connect the electrodes 21 to the pad electrodes 900 via the pins 911.

Fourth Embodiment

Next, the fourth embodiment of the invention which is a modification of the optical module 1A of the third embodiment will be described in reference to FIGS. 11 and 12. An optical module 1B in the fourth embodiment has the same configuration as the optical module 1A in the third embodiment except that a keep plate 7A is used as a pressing member in place of the lever member 7.

Figure 11A:
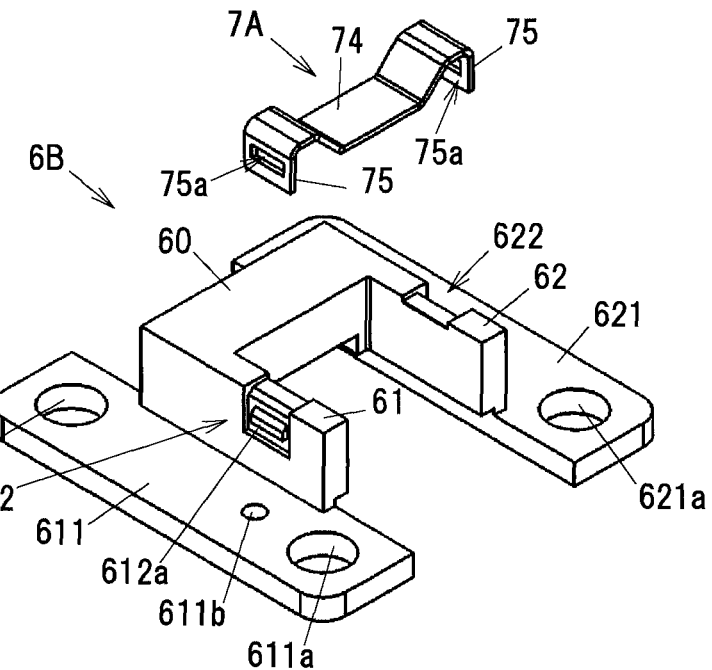
FIG. 11A is perspective view showing a heat-dissipating block and a keep plate of an optical module in a fourth embodiment and FIG. 11B is perspective view showing the heat-dissipating block and the keep plate as viewed from a different angle.
Figure 11B:
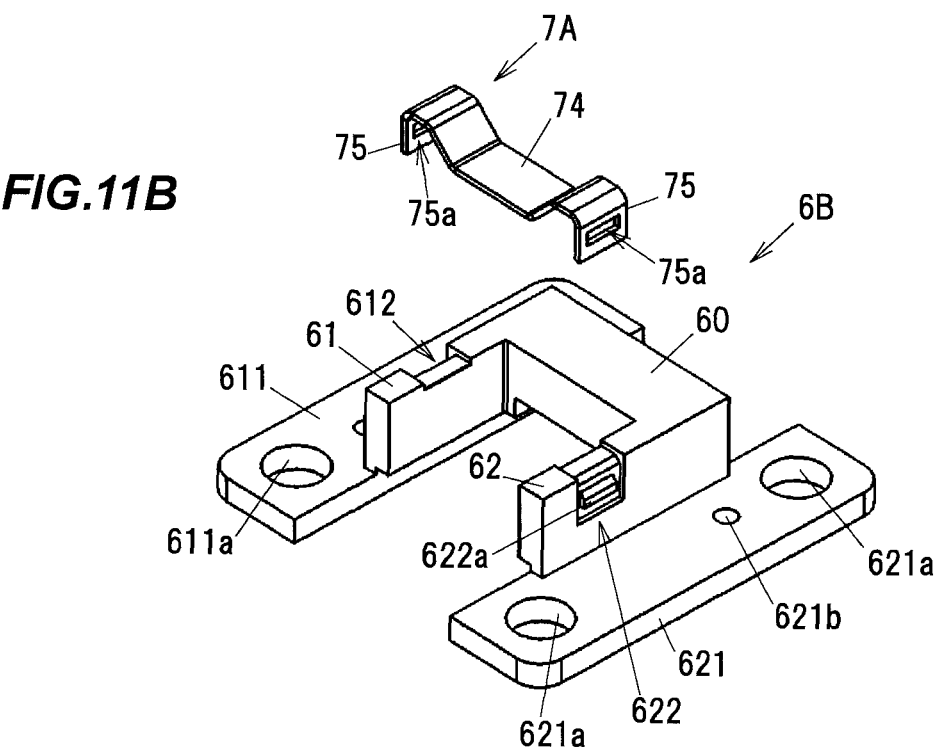

FIG. 11A is perspective view showing a heat-dissipating block 6B and the keep plate 7A of the optical module 1B. FIG. 11B is perspective view showing the heat-dissipating block 6B and the keep plate 7A as viewed from a different angle from that of FIG. 11A. FIG. 12 is perspective view showing a state in which the optical module 1B is attached to the electronic circuit board 90.

The keep plate 7A is formed by bending an elastic metal, e.g., stainless, etc., and integrally has a plate-like pressing-down portion 74 and a pair of locked portions 75 which are formed on both ends of the keep plate 7A so as to sandwich the pressing-down portion 74. A rectangular through-hole 75a is formed on the locked portion 75.

A locking portion 612 which has a protrusion 612a to be fitted to the through-hole 75a of one of the locked portions 75 is formed on the first arm 61 of the heat-dissipating block 6B. Meanwhile, a locking portion 622 which has a protrusion 622a to be fitted to the through-hole 75a of the other locked portion 75 is formed on the second arm 62.

Figure 12:
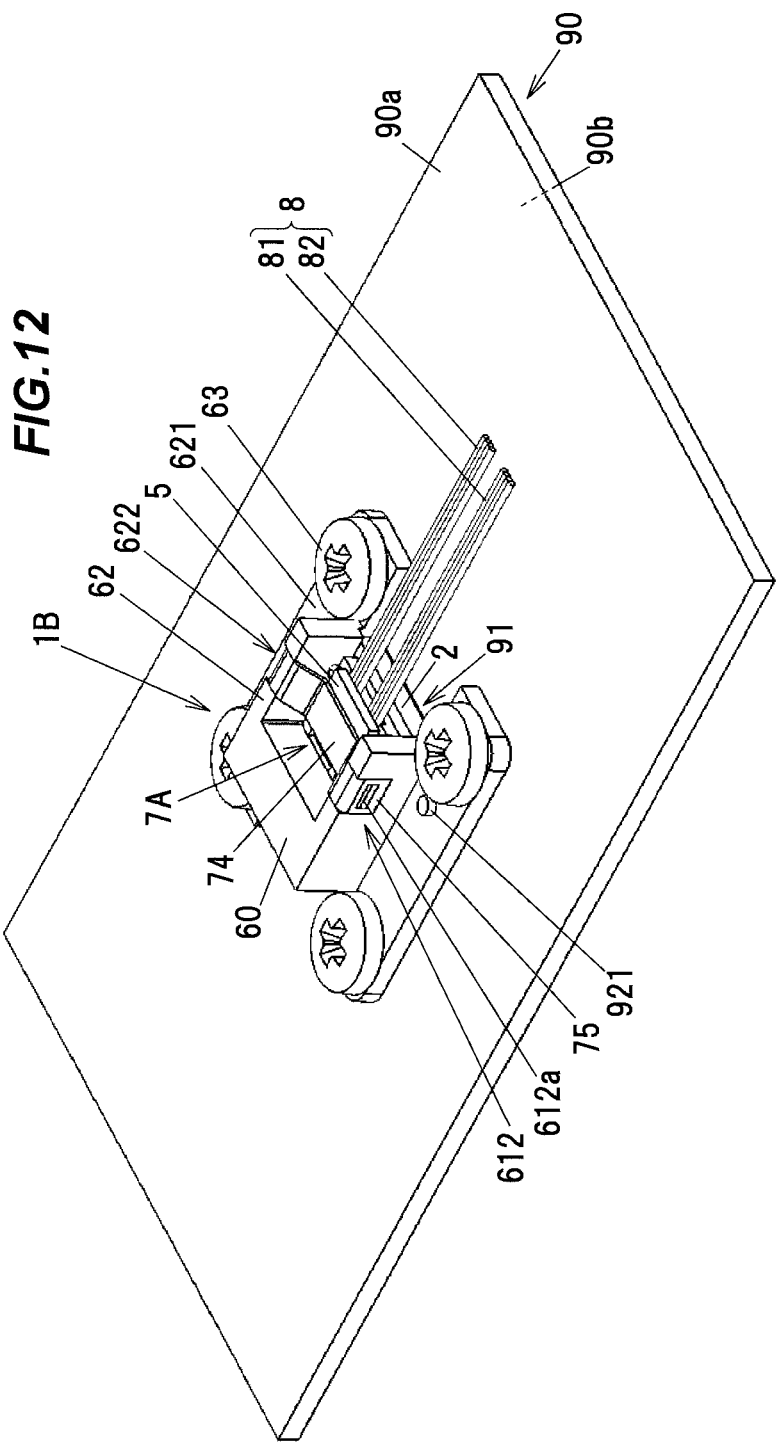
FIG. 12 is perspective view showing a state in which the optical module is attached to the electronic circuit board.

As shown in FIG. 12, when one of the locked portions 75 of the pressing-down portion 74 is locked with the locking portion 612 and the other locked portion 75 is locked with the locking portion 622, the pressing-down portion 74 elastically presses the optical connector 5 and the optical connector 5 is thereby fixed.

The functions and effects described in the third embodiment are also obtained in the fourth embodiment.

Fifth Embodiment

Next, the fifth embodiment of the invention which is a further modification of the optical module 1A of the third embodiment will be described in reference to FIGS. 13 and 14. An optical module 1C in the fifth embodiment has the same configuration as the optical module 1A in the third embodiment except that a keep plate 7B is used as a pressing member in place of the lever member 7.

Figure 13:
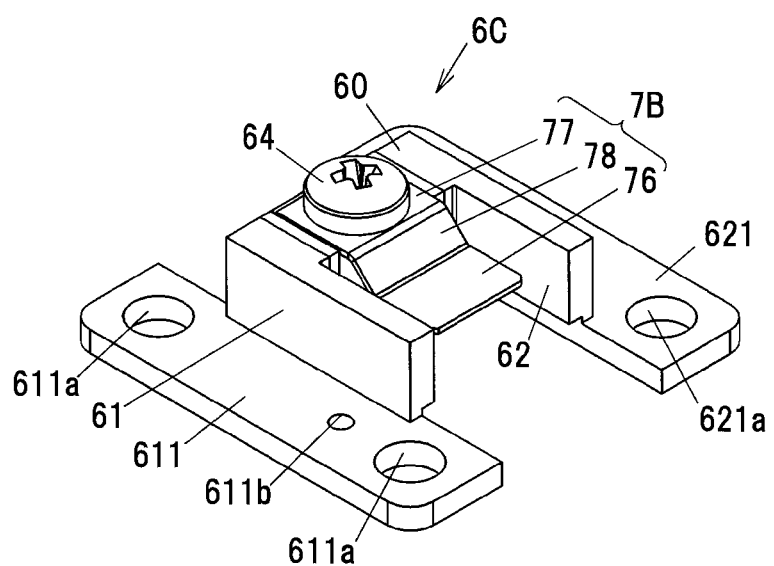
FIG. 13 is perspective view showing a heat-dissipating block and a keep plate of an optical module in a fifth embodiment.

FIG. 13 is perspective view showing a heat-dissipating block 6C and the keep plate 7B of the optical module 1C. FIG. 14 is perspective view showing a state in which the optical module 1C is attached to the electronic circuit board 90.

The keep plate 7B is formed by bending an elastic metal, e.g., stainless, etc., and integrally has a plate-like pressing-down portion 76, a fixed portion 77 fixed to the main body 60 of the heat-dissipating block 6C and a connecting portion 78 elastically connecting the pressing-down portion 76 to the fixed portion 77. The fixed portion 77 is fixed by a bolt 64 screwed into the main body 60.

Figure 14:
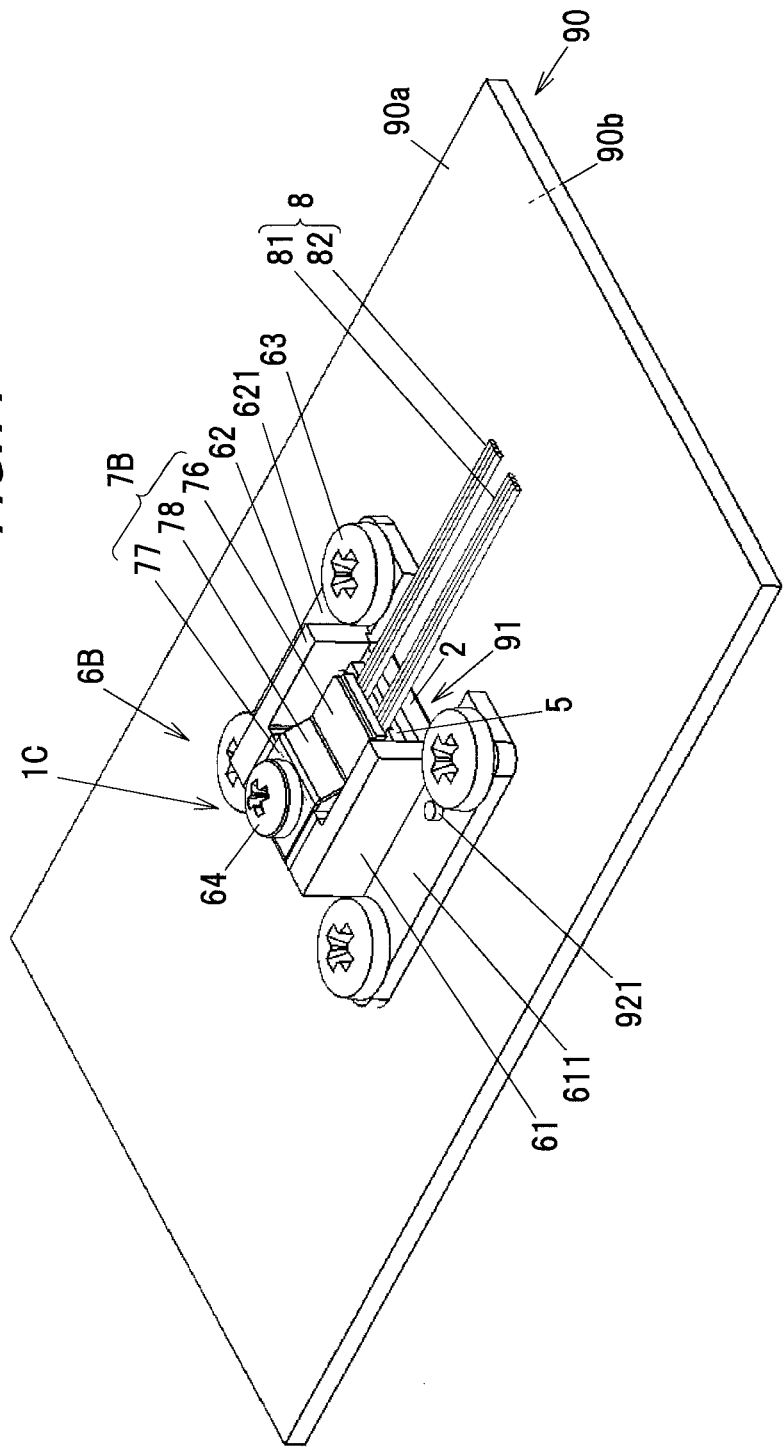
FIG. 14 is perspective view showing a state in which the optical module is attached to the electronic circuit board.

As shown in FIG. 14, the keep plate 7B elastically presses the optical connector 5 by the pressing-down portion 76, and the optical connector 5 is thereby fixed.

The functions and effects described in the third embodiment are also obtained in the fifth embodiment.

Although the embodiments of the invention have been described, the invention according to claims is not to be limited to the above-mentioned embodiments. Further, please note that all combinations of the features described in the embodiments are not necessary to solve the problem of the invention.

In addition, the invention can be appropriately modified without departing from the gist thereof. For example, although the case where the optical module has the LD element 31 as a light-emitting element and the PD element 32 as a light-receiving element has been described in the embodiments, it is not limited thereto and the optical module may have only the LD element 31 or the PD element 32.

Alternatively, the surfaces of the driver IC 41 and the preamplifier IC 42 may be directly brought into contact with the heat-absorbing surface 60b of the heat-dissipating block 6 for thermal connection without using the heat transfer member 9. Also in this case, the same functions and effects as the case of using the heat transfer member 9 can be obtained.

In addition, the configuration for fixing the lever member 7 at the locking position and the shape of the heat-dissipating block 6 are not limited those of the embodiment. A member for further heat dissipation may be provided in addition to the heat-dissipating block 6.

What is claimed is:

1. An optical module, comprising:
a circuit board;
a photoelectric conversion element mounted on the circuit board;
an optical connector for optically connecting the photoelectric conversion element and an optical fiber;
a semiconductor circuit element mounted on the circuit board and electrically connected to the photoelectric conversion element;
a pressing member for pressing and fixing the optical connector to the circuit board; and
a supporting member for supporting the pressing member,
wherein the circuit board comprises a plurality of electrodes on a non-mounting surface that is opposite to a mounting surface with the semiconductor circuit element mounted thereon,
wherein the supporting member comprises an attaching portion to be fixed to a counterpart board that has a plurality of counterpart electrodes electrically connected to the plurality of electrodes,
wherein the supporting member integrally comprises a main body extending in a direction and a pair of arm portions extending in a second direction from both ends of the main body in the first direction so as to sandwich the optical connector,
wherein the first direction intersects with an extending direction of the optical fiber held by the optical connector and the second direction is orthogonal to the first direction,
wherein protrusions are formed on the pair of arm portions,
wherein the pressing member is an elastic plate and comprises a plate-shaped pressing-down portion and a pair of locked portions formed on both ends of the pressing member so as to sandwich the pressing-down portion,
wherein through-holes to be fitted to the protrusions are formed on the pair of locked portions,
wherein the supporting member comprises a heat-absorbing surface and a heat-dissipating surface,
wherein the heat-absorbing surface is thermally connected to the semiconductor circuit element, and
wherein the heat-dissipating surface dissipates heat of the semiconductor circuit element to be absorbed through the heat-absorbing surface.

2. The optical module according to claim 1, wherein the pair of arm portions each comprise a fitting portion for fitting the circuit board thereto.

3. The optical module according to claim 1, wherein the heat-absorbing surface is formed parallel to the circuit board while sandwiching the semiconductor circuit element in between,
wherein a gap between the heat-absorbing surface and the circuit board corresponds to a thickness of the semiconductor circuit element, and
wherein a heat transfer member for conducting heat from the semiconductor circuit element to the heat-absorbing surface is disposed between the heat-absorbing surface and the semiconductor circuit element.

4. The optical module according to claim 1, wherein the optical connector is restricted from moving in a direction parallel to the circuit board by fitting a protrusion provided upright on the circuit board.

* * * * *